Dec. 14, 1943.    C. E. TACK    2,336,970
BRAKE ARRANGEMENT
Filed March 1, 1941    2 Sheets-Sheet 2
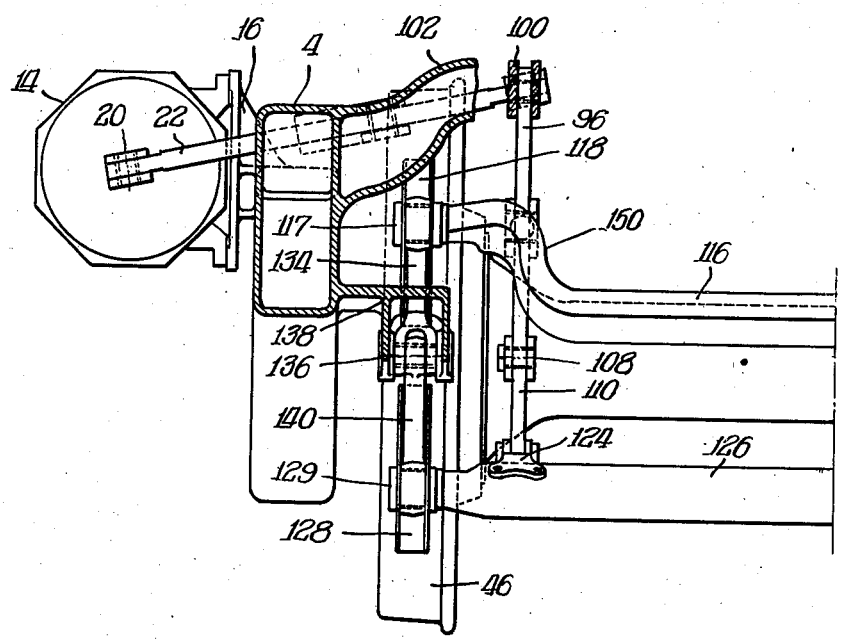
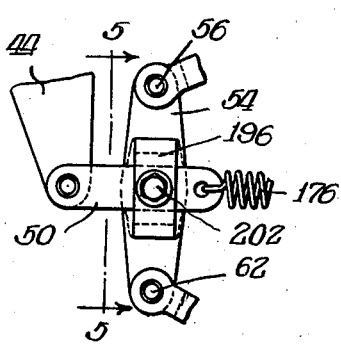
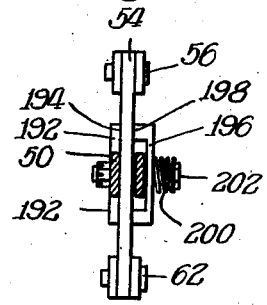
INVENTOR.
Carl E. Tack,
BY
ATTY.

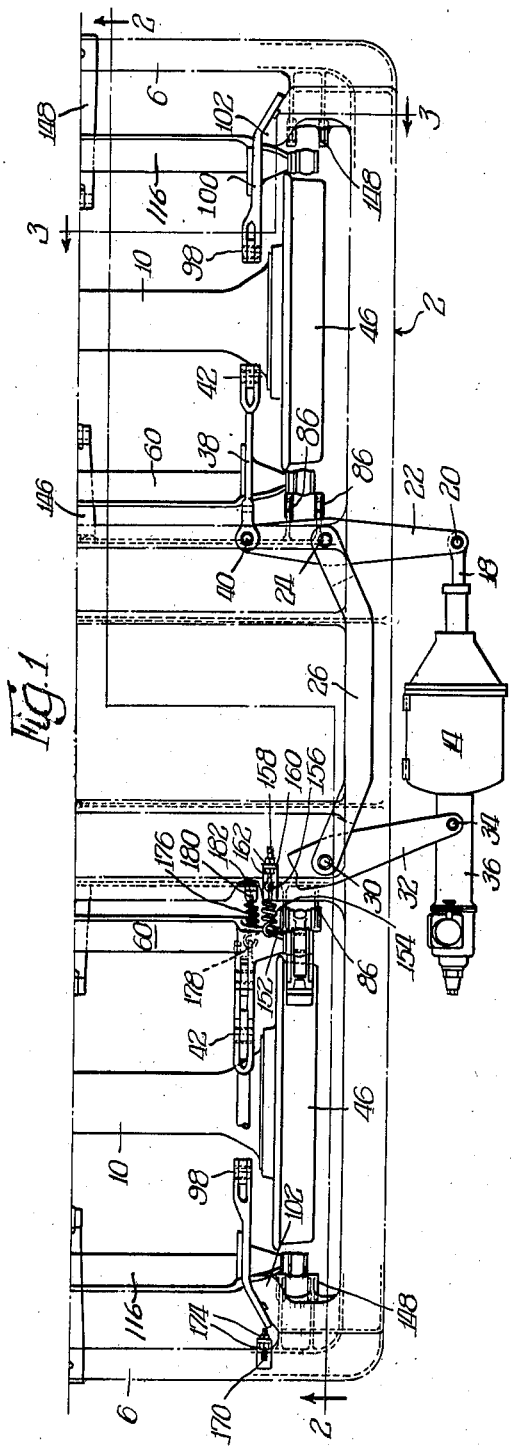

Patented Dec. 14, 1943

2,336,970

UNITED STATES PATENT OFFICE 2,336,970

BRAKE ARRANGEMENT

Carl E. Tack, Chicago, Ill., assignor to American Steel Foundries, Chicago, Ill., a corporation of New Jersey Application March 1, 1941, Serial No. 381,249

18 Claims. (Cl. 188—56)

This application is a continuation-in-part of my application, Serial No. 344,331, filed July 8, 1940, abandoned March 20, 1941, and entitled Brake arrangement.

My invention relates to railway brakes and more particularly to a novel brake arrangement having a pair of shoes supported on each side of an adjacent wheel instead of the usual clasp brake arrangement wherein a single shoe is supported at each side of a wheel.

My invention comprehends such a clasp brake wherein the brake assembly at each side of the wheel is supported in novel manner from the truck frame, said support including a fulcrum to which adjacent ends of hangers or links are pivotally connected, the opposite ends of said hangers being pivotally connected to adjacent brake heads.

Another object of my invention is to design a clasp brake arrangement wherein novel release means are afforded for the sets of brake shoes.

A more specific object of my invention is to provide a double clasp brake arrangement wherein each set of pivotally mounted brake shoes may be supported adjacent to the tread of the wheel on the trunnion ends of a set of brake beams which may be pivotally connected to opposite ends of a vertical equalizer lever.

My invention contemplates such a clasp brake arrangement wherein sets of shoes may be disposed on opposite sides of the wheels, the shoes of each set being pivotally supported from a single member.

My invention further contemplates a novel brake assembly wherein a pair of brake heads may be supported at one side of a wheel from a pair of brake beams pivotally connected adjacent to said wheel to a single lever, said heads being pivotally connected to the associated truck frame.

A further object of my invention is to design a brake assembly having a pair of brake beams supported on each side of a wheel and axle assembly wherein one brake beam may be supported above the axle level and the other beam below the axle level, and wherein one of said beams may be formed of box section with offset portions adjacent to its ends.

My invention comprehends such a brake assembly wherein brake heads supported on one side of a wheel from a pair of brake beams are pivotally supported from the associated truck frame so that the associated brake shoes will wear evenly and concentrically with said wheel.

My invention also includes novel means for supporting the brake shoes on each upper brake beam in a manner such that in released position said shoes will be maintained in spaced concentric relationship with the tread of the wheel and dragging of said upper shoes thereon will be substantially prevented.

In the drawings,

Figure 1 is a top plan view of a truck structure embodying my invention, only one half of said structure being shown because the other half is similarly arranged.

Figure 2 is a sectional view of the truck structure shown in Figure 1, the section being taken substantially in the longitudinal vertical planes indicated by the line 2—2 of Figure 1.

Figure 3 is a sectional view through the right end of the structure shown in Figure 1, the section being taken substantially in the vertical transverse planes indicated by the line 3—3 of Figure 1.

Figure 4 is a fragmentary side elevation of friction means applied to my brake arrangement to maintain brake shoes in normal released position.

Figure 5 is a fragmentary view of the device shown in Figure 4 taken substantially from the vertical transverse plane indicated by the line 5—5.

Certain details have been omitted from each figure when they are more clearly shown in other figures.

The truck structure generally indicated at 2 may be of conventional form and includes a side member 4, transverse end members 6, 6, and intermediate spaced transoms 8, 8 integrally joined with the side member 4. The truck structure 2 may be supported on spaced wheel and axle assemblies 10, 10 through well known journal means (not shown) received between the pedestal jaws 12, 12, formed adjacent to opposite ends of the side member 4.

Outwardly of the side member 4 and intermediate of each wheel and axle assembly may be supported the power means or brake cylinder 14 from a bracket 16 on the side member 4. A piston rod 18 projects outwardly from the right end of the brake cylinder 14 and is afforded a pivotal connection as at 20 to the outboard end of the diagonally arranged live cylinder lever 22 extending inboard over the side member 4. Intermediate the ends of the live cylinder lever 22 is pivotally connected as at 24 one end of the offset pull rod 26, and the opposite end of said pull rod is pivotally connected as at 30 intermediate the ends of the dead cylinder lever 32. At its outboard end the dead cylinder lever 32 is fulcrumed as at 34 to the slack adjuster 36 secured to the other end of the brake cylinder 14.

The braking arrangement is substantially similar for each wheel and axle assembly 10. Pull rods 38, 38 may be operatively connected to the power means 14 through the pivotal connections 40, 40 at the inboard ends of the respective live and dead cylinder levers 22 and 32. The opposite end of each pull rod 38 may be pivoted as at 42 to the upper end of the live truck lever 44 disposed adjacent to the wheel 46. The lower end of the live truck lever 44 may be pivotally connected as at 48 to one end of a horizontally extending link 50. Intermediate its ends, said link 50 is pivotally connected as at 52 between the ends of a vertical equalizer lever 54. The upper end of said lever 54 is pivoted at 56 to a fulcrum 58 formed on the upper brake beam 60 which is disposed above the axle level. The lower end of the vertical equalizer lever 54 is pivotally connected as at 62 to a fulcrum 64 formed on a brake beam 66 which is disposed below the axle level. Pivotally mounted as at 68 on the end of each upper brake beam 60 is a brake head 70 supporting a brake shoe 72 for engagement with the tread of the adjacent wheel 46. Likewise pivotally mounted as at 74 on the trunnion end of each lower brake beam 66 is a break head 76 supporting a brake shoe 78 for engagement with the lower periphery of the adjacent wheel 46. Well known balancing means 80, 80 are afforded for the brake heads 70 and 76 to maintain them in concentric relationship with the adjacent wheel. Also, pivotally connected to each upper brake head 70 at the pivotal connection 68 is one end of a hanger or link 82, the opposite end of said hanger 82 being pivotally connected at 84 to a downwardly projecting fulcrum bracket 86 formed on the adjacent transom in alignment with the wheels. In similar manner, a lower hanger or link 88 has at one end a pivotal connection to the lower brake head 76 at the pivotal connection 74, and at its opposite end, said hanger 88 is pivotally connected to the fulcrum bracket 86 and to the lower end of the hanger 82 at the pivotal connection 84.

Intermediate the ends of the live truck lever 44 is pivoted as at 90 one end of a pull rod 92 whose opposite end is pivoted at 94 intermediate the ends of a dead truck lever 96. The lever 96 is pivotally supported as at 98 from a fulcrum 100 secured in any convenient manner to an inboard projecting arm 102 formed on said truck frame adjacent to the juncture of the side member 4 and the end rail 6. The lower end of the dead truck lever 96 is pivotally connected as at 104 to an end of a horizontally extending link 106, said link 106 being afforded a pivotal connection intermediate its ends as at 108 to a vertical equalizer lever 110 between the ends thereof. The upper end of said vertical lever 110 is pivoted as at 112 to a fulcrum 114 on the upper brake beam 116 disposed above the axle level. On the trunnion end of each upper brake beam 116 is pivotally mounted as at 117 an upper brake head 118 supporting a brake shoe 120 for engagement with the tread of the adjacent wheel 46. The lower end of the vertical equalizer lever 110 is pivoted as at 122 to a fulcrum 124 formed on the lower brake beam 126 disposed below the axle level. On the trunnion end of each lower brake beam 126 is pivotally mounted as at 129 a lower brake head 128 supporting a brake shoe 130 for engagement with the tread of the adjacent wheel. The brake heads 118 and 128 are afforded well known balancing means 132, 132. Also pivotally connected to the upper brake head 118 at the pivotal connection 117 is an upper hanger or link 134, the lower end of which is pivotally connected as at 136 to a downwardly projecting fulcrum bracket 138 formed on the adjacent end rail 6 in alignment with the wheels. Pivotally connected at 136 to the upper hanger 134 and to the fulcrum bracket 138 is one end of a lower hanger or link 140 whose opposite end is pivotally connected to the lower brake head 128 at the pivotal connection 129.

The support for the brake heads, which is afforded by the respective hangers 82 and 88, and 134 and 140, permits the brake shoes to wear evenly and concentrically with the tread of the adjacent wheel 46. As the shoes become worn in operation, the included angle between hangers 82 and 88, and 134 and 140 becomes more acute, thus allowing the braking force to be applied to the wheel in a radial direction.

Each lower brake beam 66 and 126 may be formed of I section, and in addition to the support afforded by the respective hangers 88, 88 and 140, 140 each lower brake beam 66 and 126 may be supported intermediate its ends by the respective balance hangers 142 and 144. Each balance hanger 142 is pivotally supported by a strap 146 secured in any convenient manner to the adjacent transom, and likewise each balance hanger 144 is pivotally supported by a strap 148 secured over the adjacent end rail 6. The lower ends of the balance hangers 142 and 144 are pivotally connected to fulcrums formed on the respective brake beams 66 and 126.

Each upper brake beam 60 and 116 may be formed with an offset portion as at 150 to afford clearance for the center sill (not shown) when the car moves around a curve. Each of said upper brake beams may be formed of box-section to take torsional stresses caused by the offset portions 150, 150. On each upper brake beam 60 and adjacent to each brake head 70 is formed a lug 152 to which is connected one end of a coil spring 154, the opposite end of said spring being connected as at 156 to an adjusting screw 158. The adjusting screw 158 extends through a bracket 160 secured in any convenient manner to the adjacent transom 6. On opposite sides of the bracket 160, adjusting and retaining nuts 162, 162 are afforded threaded engagement with the screw 158. In similar manner each upper brake beam 116 is afforded a lug 164 adjacent to the brake head 118, and connected to said lug is one end of a spring 166 whose opposite end is connected as at 168 to an end of the adjusting screw 170. The adjusting screw 170 extends through a bracket 172 secured in any convenient manner to the adjacent end rail 6. Adjusting nuts 174, 174 are threaded on said screw 170 on opposite sides of the bracket 172. The tension of the springs 166 and 154 may be regulated by the adjusting screws 170 and 158 so that the respective upper brake beams will be held in their normal released positions and the brake shoes will be restrained from dragging on the tread of the wheels because of jarring from irregularities in the track.

Release means for the set of brake beams 60 and 66 inwardly of the wheels is afforded by a coil spring 176 connected at one end to the adjacent end of the link 50 as at 178, and connected at its opposite end as at 180 to a lug 182 on the adjacent transom 8. The set of brake beams 116 and 126 outwardly of the wheels is afforded release means by a coil spring 184 connected to the adjacent end of the horizontal link 106 as at 186, and connected at its opposite end as at 188 to a bracket 190 secured on the adjacent end rail 6 in any convenient manner.

When the brakes are in released position, application of the power means 14 causes the piston 18 to move to the right and rotate the inboard ends of the cylinder levers toward each other in well known manner. The pull rods 38, 38 are thus moved inwardly so that the lower ends of the live and dead truck levers are rotated toward each other, and the equalizer levers 54, 54 and 110, 110 are moved toward the adjacent axle by means of the linkage connections 50, 50 and 106, 106. In this manner the brake shoes are brought into engagement with the tread of the adjacent wheels.

Inward movement of the equalizer levers places the release springs in tension. As the brakes are released, the cylinder and truck levers move in directions reverse to those above described and the release springs 176, 176 and 184, 184 return the equalizer levers 54 and 110 to their normal released positions with the brake shoes out of engagement with the wheels.

In Figures 4 and 5 is shown a different arrangement by which the brake shoes on the upper beams 60 and 116 are restrained from engagement with the tread of the adjacent wheel during release. It may be noted that the action of gravity on each upper brake beam 60 and 116 may cause the equalizer levers 54 and 110 to rotate about their respective pivot points 52 and 108 and in this manner move the upper brake shoes into engagement with the wheel. Such undesirable rotation of each equalizer lever 54 and 110 may be resisted by a friction device which is mounted at each pivotal connection 52, 52 and 108, 108 and which is shown applied to one of said pivotal connections 52, 52 although it is understood that it may be applied to each of said pivotal connections. The friction device comprises oppositely directed vertical friction walls 192, 192 formed on one member of link 50 and having frictional engagement at 194, 194 with the inner surfaces of the vertical equalizer lever 54. A friction shoe 196 on the opposite side of said lever 54 is urged into spaced frictional engagement at 198, 198 with outer surfaces thereof by a spring 200. The spring 200 may be sleeved over the pivot member or bolt 202 and is compressed between said friction shoe and a washer seated against the head of said bolt 202. Any relative rotation between the vertical lever 54 and the horizontal link 50 will be frictionally resisted by the engagement at 198, 198 and 194, 194, and in this manner the lever 54 is maintained substantially at right angles to the link 50. The friction device thus holds the associated upper brake beam in its normal released position and resists any tendency of said beam to fall forward because of gravity.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a wheel and axle assembly, a brake assembly including horizontal brake beams supported on each side of said axle, brake heads on said beams, a lever pivotally connecting the beams at one side of said axle, a member having a pivotal connection intermediate the ends of said lever, and means frictionally resisting relative movement of said lever and said member.

2. In a brake arrangement, a wheel and axle assembly and braking means therefor comprising two brake beams supported at one side thereof, two brake beams supported at the other side thereof, brake heads on each of said beams, levers pivotally connecting the beams at each side of said assembly, other levers and pull rods connecting said first-mentioned levers, and operating and release means for said brake arrangement.

3. In a brake arrangement, a wheel and axle assembly, braking means therefor comprising a pair of beams at one side thereof, a pair of beams at the other side thereof, a pair of levers operatively connected between the beams of each pair, and an operative connection between corresponding levers of respective pairs at each end of the assembly.

4. In a brake arrangement, a truck frame, a supporting wheel and axle assembly, and braking means comprising a pair of brake beams at each side of said axle, brake heads pivotally mounted at opposite ends of said beams, equalizing levers pivotally connected to said beams adjacent opposite ends thereof, links pivotally connected to said levers intermediate the ends thereof, hanger means supporting said heads from said frame, and release means operatively connected to said levers and said frame.

5. In a brake arrangement, a truck frame, a supporting wheel and axle assembly, and braking means comprising a pair of brake beams at each side of said axle, brake heads pivotally mounted at opposite ends of said beams, equilizing levers pivotally connected to said beams adjacent opposite ends thereof, hangers pivotally supporting said heads from said frame, and release means operatively connected to said levers and said frame.

6. In a brake arrangement, a wheel and axle assembly, and braking means comprising brake beams supported above and below the axle level on each side of said assembly, brake heads supported on opposite ends of said brake beams, levers pivotally connecting said brake beams adjacent their ends, and power means operatively connected to each lever.

7. In a brake arrangement, a wheel and axle assembly, and braking means comprising a plurality of brake beams supported at each side of said assembly, fulcrums on said brake beams, brake heads supported on opposite ends of said brake beams, levers having pivotal connections at their ends to said fulcrums, and power means operatively connected to each lever.

8. In a brake arrangement, a truck frame, a supporting wheel and axle assembly having braking means comprising a pair of beams at one side of said assembly, a pair of beams at the opposite side thereof, levers pivotally connecting each pair of beams adjacent their ends, an operative connection between the levers at each end of the assembly, each of said operative connections comprising a live lever, and means for actuation thereof.

9. In a brake arrangement, a wheel and axle assembly and braking means therefor comprising a pair of pivotally connected beams at one side thereof, a pair of pivotally connected beams at the opposite side thereof, each of said pivotal connections comprising a vertical lever, and operative connections between the levers at corresponding ends of said assembly including actuating means therefor.

10. In a brake arrangement, a truck frame, supporting wheels, and a brake assembly hung from said frame comprising a pair of beams at one side of said wheels, a pair of beams at the opposite side of said wheels, levers connecting each pair of beams adjacent corresponding ends thereof, an operative connection between corresponding levers at each end of said assembly, each of said operative connections comprising a live lever, and actuating means therefor.

11. In a brake arrangement, a truck frame, a supporting wheel, and a brake assembly comprising a plurality of brake beams supported at each side of said wheel, brake heads supported on said beams, a lever pivotally connecting said beams, a connection intermediate the ends of said lever to actuating means, and means connecting said heads to said frame.

12. In a brake arrangement, a truck frame, a supporting wheel and axle assembly and braking means at one side of said assembly comprising hangers pivotally supporting a pair of brake beams, certain of said hangers supporting one of said beams above their connection to said frame and other of said hangers supporting the other of said beams below their connection to said frame, vertical levers connected between said beams at corresponding ends thereof, and means for actuating said levers.

13. In a brake arrangement, a frame, a supporting wheel and axle assembly and braking means for said assembly comprising a plurality of brake beams at one side thereof, a plurality of brake beams at the opposite side thereof, levers pivotally connecting the beams at each side of said assembly, and operative connections between the levers at corresponding ends of said assembly.

14. In a brake arrangement, a wheel and axle assembly, braking means therefor comprising two horizontal brake beams supported on each side of said assembly, brake shoes thereon, levers connected to said beams, members connected to said levers and comprising means frictionally resisting relative movement of said levers and said members, and actuating means connected to said members.

15. In a brake arrangement, a wheel and axle assembly and braking means therefor comprising a plurality of beams supported at one side of said assembly, vertical levers pivotally connecting said beams at corresponding ends thereof, a horizontal member pivoted to each of said levers and frictionally restrained against relative rotation with respect thereto, and means for actuating said members.

16. In a brake arrangement, a wheel and axle assembly and braking means comprising a plurality of beams at one side of said assembly, a plurality of beams at the other side thereof, levers pivotally connecting the beams at each side of the assembly, and operating and release means connected to said levers.

17. In a brake arrangement, a wheel and axle assembly and braking means comprising a plurality of beams at one side of said assembly, a plurality of beams at the other side thereof, levers pivotally connecting the beams at each side of the assembly, and operating and release means connected to said levers, said operating means comprising operatively connected live and dead levers at each end of the assembly.

18. In a brake arrangement, a wheel and axle assembly and braking means comprising a plurality of beams at one side of said assembly, a plurality of beams at the other side thereof, levers pivotally connecting the beams at each side of said assembly, actuating means connected to each of said levers, and frictional means for resisting relative pivotal movement between each lever and the associated actuating means at their point of connection.

CARL E. TACK.